United States Patent
Erckert (10) Patent No.: US 6,493,401 B1
(45) Date of Patent: Dec. 10, 2002

(54) RECEIVING CIRCUIT AND METHOD FOR A CONTROLLED AREA NETWORK SYSTEM

(75) Inventor: Ricardo Erckert, Bad Aibling (DE)

(73) Assignee: STMicroelectronics GmbH, Grasbrunn (DE)

( * ) Notice: Subject to any disclaimer, the term of this patent is extended or adjusted under 35 U.S.C. 154(b) by 0 days.

(21) Appl. No.: 09/191,767

(22) Filed: Nov. 13, 1998

(30) Foreign Application Priority Data

Nov. 13, 1997 (DE) .......................................... 197 50 317

(51) Int. Cl.[7] .............................................. H04L 27/06
(52) U.S. Cl. ...................... 375/316; 375/224; 375/317; 455/130; 714/43
(58) Field of Search ................................ 375/316, 317, 375/238, 239, 242, 256, 257, 286, 353, 224; 307/200.1; 329/300, 304, 311; 332/106; 455/130; 714/43

(56) References Cited

U.S. PATENT DOCUMENTS

| | | | | |
|---|---|---|---|---|
| 5,539,778 A | * | 7/1996 | Kienzler et al. ............. | 375/317 |
| 5,765,031 A | | 6/1998 | Mimuth et al. ......... | 395/183.19 |
| 5,781,585 A | * | 7/1998 | Dorner et al. ............... | 375/224 |
| 6,115,831 A | * | 9/2000 | Hanf et al. ..................... | 714/43 |

FOREIGN PATENT DOCUMENTS

| | | |
|---|---|---|
| DE | 195 09 133 A1 | 10/1995 |
| EP | 0 725 513 A1 | 8/1996 |
| FR | 2 695 780 A1 | 3/1994 |

* cited by examiner

*Primary Examiner*—Stephen Chin
*Assistant Examiner*—Shuwang Liu
(74) *Attorney, Agent, or Firm*—Lisa K. Jorgenson; Brian L Johnson; Seed IP Law Group PLLC (57) ABSTRACT

A receiving circuit is described for a CAN (Controlled Area Network) system with digital data transfer via a bus with parallel, redundant pulse signal transfer via two lines. The receiving circuit includes a comparator circuit assembly for differential evaluation of the two pulse signals received via the two lines, with an offset voltage being superimposed on the pulse signal received via one of the two lines prior to said differential evaluation. The comparator circuit assembly superimposes both a positive offset voltage and a negative offset voltage. A bistable multivibrator circuit is connected between the output side of the comparator circuit assembly and the output of the receiving circuit.

17 Claims, 6 Drawing Sheets

RECEIVING CIRCUIT AND METHOD FOR A CONTROLLED AREA NETWORK SYSTEM

TECHNICAL FIELD

The invention relates generally to a Controlled Area Network and more particularly to a receiving circuit and method for such a network.

BACKGROUND OF THE INVENTION

A Controlled Area Network (CAN) system is provided for motor vehicles and comprises a plurality of transmitters and receivers interconnected via a bus line system. This allows control systems, sensors, measurement transducers and receivers, control signal receivers, actuating means etc. to be linked to each other.

For reasons of safety, a preferred CAN system performs a digital data transfer via a double-line bus having two lines, with the pulse signals to be transmitted being transmitted simultaneously via both lines and being synchronous in terms of pulse times and pulse length thereof, but opposite in terms of logic value. This provides a transfer redundance ensuring an error-free data transfer also in case of numerous error conditions of the bus system. Such errors are line interruptions, line short circuits towards battery voltage or ground and mutual short circuits between the two lines of the double-line bus.

Figure 6:
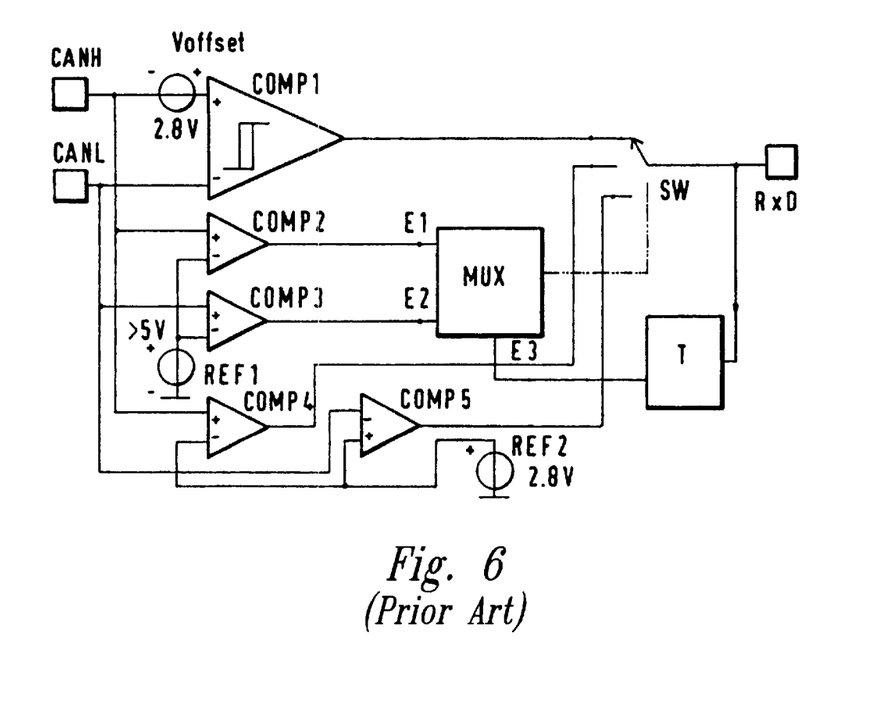
FIG. 6 shows the afore-described conventional receiving circuit.

A known receiving circuit comprising such a double-line bus system is known, for example, in the form of integrated circuit PCA82C252 of Philips. FIG. 6 shows in a block diagram the essential components of this known receiving circuit of interest here. The known circuit comprises two terminals for connection to a first line CANH and for connection to a second line CANL of the double-line bus, respectively. CANH is connected to a non-inverting input of a comparator COMP1 via an offset voltage source Voffset, and CANL is connected directly to an inverting input of comparator COMP1. Voffset superimposes an offset voltage of +2.8V on the pulse signal received via CANH. The pulse signal received via CANH furthermore is fed to non-inverting inputs of comparators COMPS2 and COM4. The pulse signal received via CANL is fed to a non-inverting input of a comparator COMP3 and to an inverting input of a comparator COMP5. The inverting inputs of COMP2 and COMP3 are connected to a reference voltage source REF1 supplying to these inverting inputs a reference voltage of +5V. By means of a reference voltage source REF2, a reference voltage of +2.8V is fed to the inverting input of COMP4 and to the non-inverting input of COMP5.

The outputs of comparators COMP1, COMP4 and COMP5 are connected to three different inputs of a switching means SW connected on its output side to an output terminal RxD of the receiving circuit. Switching over of switching means SW is controlled by a multiplex control logic circuit MUX comprising a first input E1 connected to the output of COMP2, a second input E2 connected to the output of COMP3 and a third input E3. E3 is connected to the input of a timer T having its input connected to the output side of switching means SW.

Figure 7:
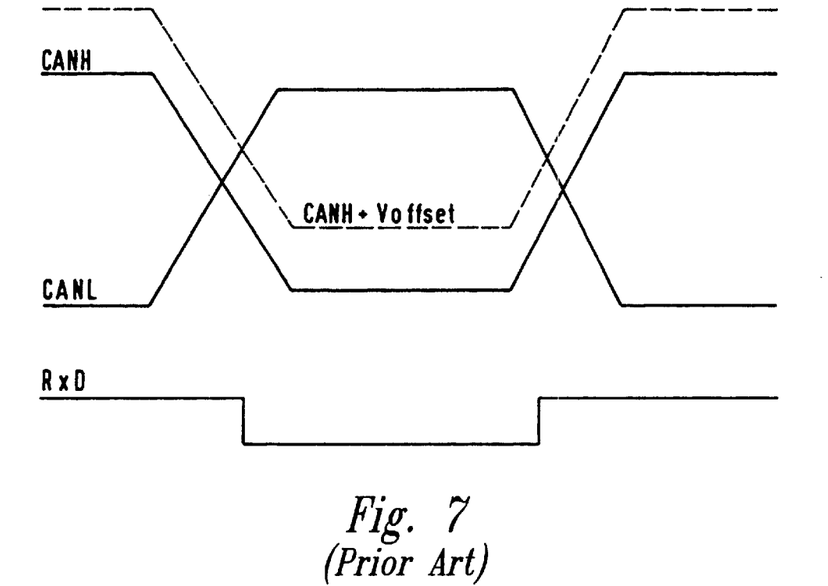
FIGS. 7 to 9 show signal paths for various operating conditions of the conventional receiving circuit.
Figure 8:
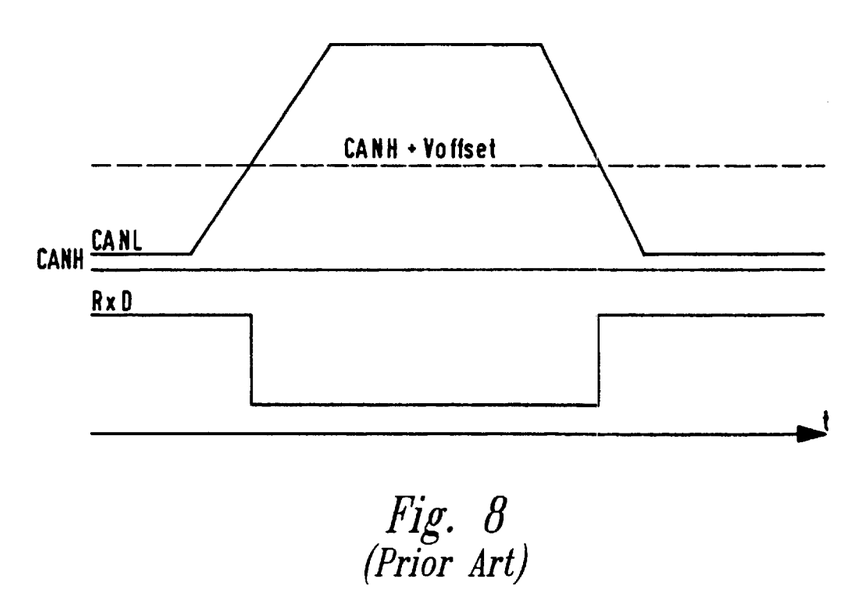
Figure 9:
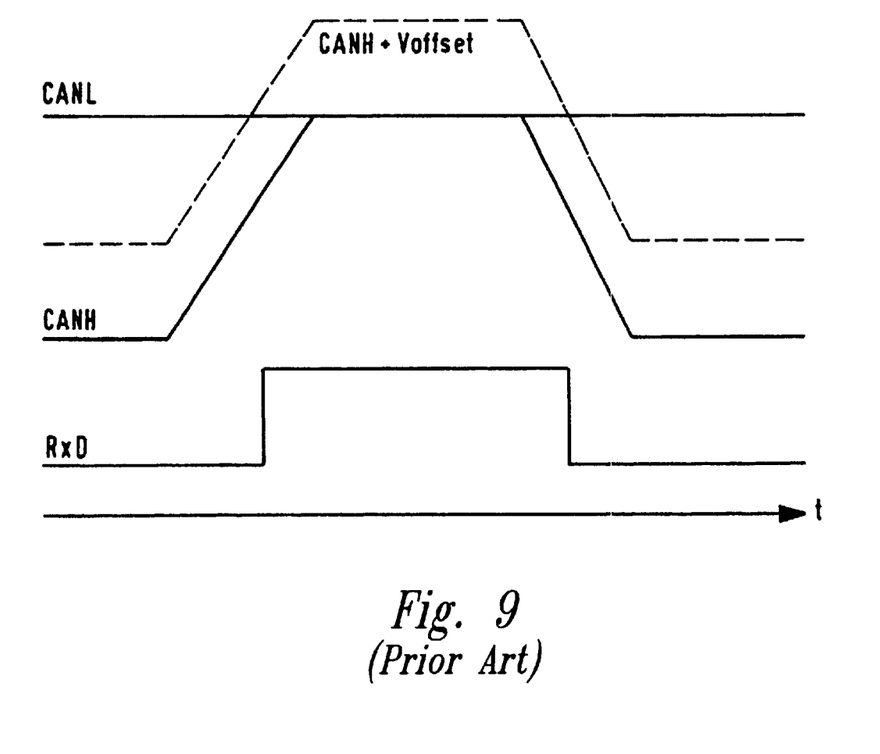

The mode of operation of this known receiving circuit will now be elucidated with the aid of FIGS. 7 to 9. Eight possible modes of operation will be considered depending on the condition of the double-line bus, namely:

case 1: lines CANH and CANL operate properly
case 2: line CANH is interrupted
case 3: line CANL is interrupted
case 4: line CANH is short circuited to battery
case 5: line CANL is short circuited to ground
case 6: line CANH is short circuited to ground
case 7: line CANL is short circuited to battery
case 8: lines CANL and CANH are short circuited to each other.

The mode of operation of the receiving circuit will now be discussed briefly for these cases. FIGS. 7 to 9 each show the pulse signal on CANL, the pulse signal on CANH, and in broken lines the pulse signal of CANH increased by +Voffset, and the output signal of the receiving circuit arising at RxD. For the sake of brevity and simplicity, the individual signals are designated only with the names of the associated lines and terminals, respectively.

The mode of operation of the known receiving circuit according to FIG. 6 will now be elucidated briefly with respect to the eight cases indicated.

Case 1

The associated signal paths are shown in FIG. 7. As soon as the potential of CANL reaches the value of CANH+Voffset, the output signal of the receiving circuit changes from a high to a low logic value. When CANL thereafter drops again below CANH+Voffset, the output of the receiving circuit changes from a low to a high logic value. The data content contained in CANH thus is reflected on the output of the receiving circuit.

Case 2

When line CANH is interrupted, a low logic value appears at the corresponding input terminal of the receiving circuit. The reason therefor is that the inputs of the receiving circuit connected to CANH and CANL are preceded by shunt resistors connecting CANH to ground and CANL to the positive voltage +5V, which constitutes the potential value of the high logic value. When line CANH is interrupted, the corresponding input terminal of the receiving circuit thus is connected to ground via the associated shunt resistor.

The related signal diagram in FIG. 8 shows that in this case the potential of CANH remains constant on a low value and CANH+Voffset thus remain on a correspondingly increased constant value. As the pulse signal of CANL still exceeds and then falls below the threshold value established by CANH+Voffset, a usable and correct pulse signal is still created at the output terminal RxD.

Case 3

When line CANL is interrupted, the corresponding input terminal of the receiving circuit is raised to +5V via the associated shunt resistor, and this voltage value is fed to the inverting input of comparator COMP1 in constant manner. This is shown in the signal diagram in FIG. 9. Due to the fact that the constant potential value of CANL in this case crosses the potential path CANH+Voffset, a pulse signal is created at output terminal RxD which contains the information of the pulse signal received via CANH and is only inverted with respect to the pulse signal on the output side which is obtained for cases 1 and 2.

Case 4

A short circuit of CANH towards a voltage of more than 5V is determined with the aid of comparator COMP2. The signal occurring at the output thereof during such determination effects via multiplex logic control circuit MUX switching over of the switching means SW to the output of comparator COMP5. The receiving circuit now operates in a single-line mode using the pulse signal arriving via CANL and deciding whether this pulse signal is greater or smaller than the reference voltage of 2.8V.

Case 5

When CANL is short circuited to ground, this results in a permanent dominant voltage level at output RxD, i.e., a voltage level that is permanently lower than the switching threshold value CANH+Voffset and thus the sum of the pulse signal voltage entering via CANH and the offset voltage. As the CAN protocol prescribes a logic value change of the pulse signals transferred at the latest after a predetermined period of time after beginning of the particular pulse., the condition that a logic value change no longer occurs at output RxD, constitutes a violation of the CAN protocol. For monitoring such a violation, timer T is provided. When the latter detects no logic value change at output RxD after a predetermined delay time, timer T via multiplex logic control circuit MUX effects switching over of switching means SW such that RxD is connected to the output of COMP4, so that as of this moment only a single-line operation takes place, evaluating the pulse signals arriving via CANH. Until the timer has responded and effected switching over to such single-line operation, data transferred, however, have been missed. It is thus necessary to retransfer these data from the transmitting point. This means that a certain amount of the data transmitted always has to be stored on the transmitter side in order to permit retransmitting to the receiving circuit in case of this error.

Case 6

A short circuit of CANH to ground leads to the same conditions and the same circuit diagram as shown in FIG. 8. This means that a correct data transfer still takes place in this case too.

Case 7

When CANL is short circuited towards the battery voltage, this is detected with the aid of COMP3, which via MUX results in switching over of switching means SW such that RxD is connected to the output of CON94. Single-line operation then takes place using the pulse signal received via CANH, which again renders possible a correct data transfer.

Case 8

A short circuit between CANH and CANL results in a permanent dominant state. This means, a logic value change no longer takes place at output RxD of the receiving circuit. As in case 5, this is determined by means of timer T. Due to the fact that this permanent dominant state is ascertained by the transmitter as well, switching over to single-line operation using CANH is effected on the transmitter side, while CANL is left open on the transmitter side and thus in a floating state in terms of potential. Due to the fact that the determination of this error takes place with a delay, a new data transfer has to be performed in this case as well, entailing the necessity to store the transmitted data for a predetermined period of time each.

SUMMARY OF THE INVENTION

The invention makes available a receiving circuit in which in error case 5, i.e., short circuit of line CANL to ground, no loss of data takes place when no data are stored on the transmitter side.

A receiving circuit according to the invention, with respect to comparators COMP2 to COMP5, multiplex control logic circuit MUX and switching means SW, has the same structure as the known circuit shown in FIG. 6. The receiving circuit according to the invention, in comparison with the known receiving circuit, has substantially the following differences:

1. Comparator circuit COMP1 of the known receiving circuit is replaced by a comparator circuit assembly superimposing on the pulse signal received via both lines both a positive and a negative offset voltage and having two comparator outputs. A first one of these comparator outputs delivers a first logic potential value when the pulse signal without offset superimposition exceeds a higher, first threshold value corresponding to the potential value of the other pulse signal increased by the positive offset voltage, and otherwise delivers a second logic potential value. The second comparator output delivers the first logic potential value when the pulse signal without offset superimposition exceeds a lower, second threshold value corresponding to the potential value of the other pulse signal reduced by the negative offset voltage, and otherwise delivers the second logic potential value.

2. Between this comparator circuit assembly and the signal output, there is connected a bistable multivibrator circuit which can be switched to a setting state by a change of the first and/or second comparator output to the first logic potential value, and which can be switched to a resetting state by a change of the first and/or second comparator output to the second logic potential value.

The circuit according to the invention, in cases 1 to 4 and 6 to 8, operates in the same manner as the known receiving circuit. A different mode of operation arises in case 5, i.e., in case of a short circuit of CANL to ground. In case of this error, the circuit according to the invention remains without delay and in proper operation so that no data loss can take place and no transmitted data need to be stored on the transmitter side in this error case, either.

In a preferred embodiment of the invention, the comparator circuit assembly provided in place of COMP1 of the known circuit, consists of two comparators having their inverting inputs connected directly to a fine of the double-fine bus and having their non-inverting inputs connected to the other line of the double-line bus via one offset voltage source each. Due to this design, both a positive and a negative offset voltage are superimposed on the pulse signal received via a line. Both comparators thus detect when the pulse signal without offset superimposition exceeds the higher, first threshold value and the lower, second threshold value, respectively.

A preferred embodiment of the invention uses as bistable multivibrator circuit a dynamic RS flip-flop having two setting inputs responsive to increasing edges and two resetting inputs responsive to decreasing edges. One of the two setting inputs and one of the two resetting inputs are each connected to the first comparator output, and the second setting input and the second resetting input are connected to the second comparator output.

Standard RS flip-flops with static inputs involve the disadvantage that the setting input and the resetting input must not be fed with setting-activating and, respectively, resetting-activating pulses which overlap in time. When the resetting input is fed with a pulse activating the same, before the pulse just activating the setting input has terminated, an undefined or not sensible mode of operation of such a flip-flop results.

According to a preferred embodiment of the invention, a dynamic RS flip-flop is used. With such flip-flops it is admissible to feed to the resetting input a pulse activating the same, before the pulse activating the setting input is over, or vice versa. Non-permissible states as with the static RS flip-flop do not exist in case of the dynamic RS flip-flop. Such a dynamic RS flip flop can be provided and operated with a plurality of setting inputs and with a plurality of resetting inputs.

Due to the fact that the evaluation of the two pulse signals arriving via the two lines by means of the two comparators of the comparator circuit assembly gives rise to overlapping of the pulses occurring at the outputs of both comparators, a static standard RS flip-flop would not be suitable for the bistable multivibrator circuit of the receiving circuit according to the invention. A bistable multivibrator circuit in the form of a dynamic RS flip-flop is therefore preferred.

BRIEF DESCRIPTION OF THE DRAWINGS

The invention will now be elucidated in more detail by way of a preferred embodiment shown in the drawings, in which.

DETAILED DESCRIPTION OF THE INVENTION

Figure 1:
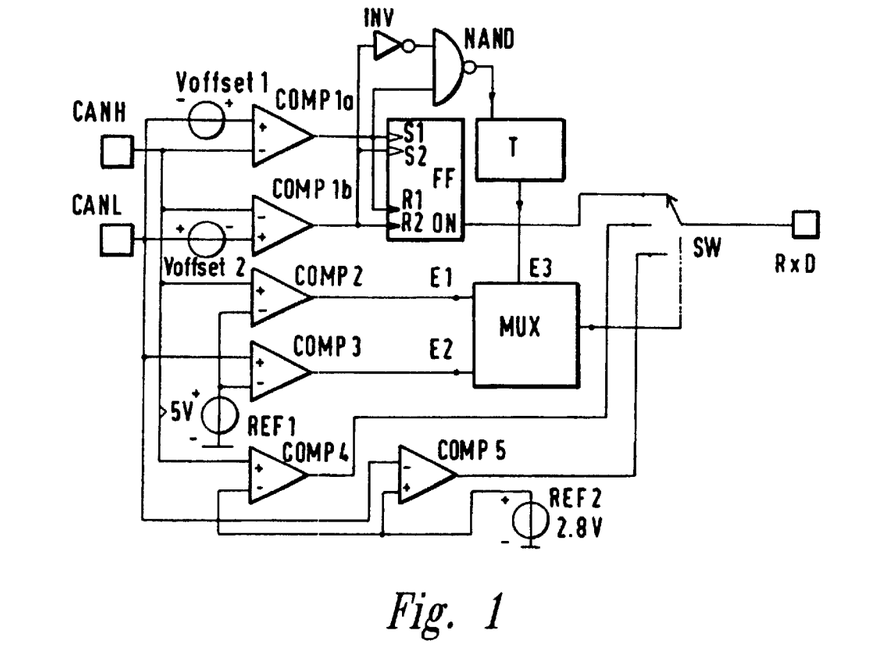
FIG. 1 shows an embodiment of a receiving circuit according to the invention.

As has already been mentioned hereinbefore, the receiving circuit according to the invention in part is identical with the conventional receiving circuit. When comparing FIGS. 1 and 6, one can see that the circuit of the invention according to FIG. 1 is identical therewith as regards comparators COMP2 to COMP5, multiplex control logic circuit MUX and switching means SW and with respect to the reference voltage sources for COMP2 to COMP5. Further identity is present as regards timer T and the connection thereof to MUX, however with the input signal for the timer being obtained at a different location than in the conventional circuit.

In so far as there is correspondence between FIGS. 1 and 6, the same designations are used for like circuit components, and reference may be made to the explanations already given in this respect in connection with FIG. 6.

Instead of the one comparator COMP1 of the conventional receiving circuit according to FIG. 6, the embodiment of a receiving circuit according to the invention, as shown in FIG. 1, comprises two comparators COMP1a and COMP1b. Each of these two comparators comprises a non-inverting comparator input +, an inverting comparator input − and a comparator output. The inverting inputs of these two comparators COM1a and COMP1b are each connected directly to line CANH of the double-line bus. The non-inverting inputs of COMP1a and COMT1b are each connected to the second line CANL of the double-line bus via an offset voltage source Voffset1 and Voffset2, respectively. As indicated by the polarity signs of these two offset voltage sources, the pulse signal VCANL arriving via CANL has a positive offset voltage superimposed thereon by Voffset1 and a negative offset voltage superimposed thereon by Voffset2.

The two comparators COMP1a and COMP1b are followed by a dynamic RS flip-flop FF having two setting inputs S1 and S2, which are responsive to ascending pulse edges, and two resetting inputs R1 and R2, which are responsive to decreasing pulse edges (a suitable example of such a dynamic flip-flop is described below in connection with FIG. 10). S1 and R1 are connected to the output of COMP1a, and S2 and R2 are connected to the output of COMP1b. An inversion output QN of flip-flop FF is connected to an input line of switching means SW.

The outputs of COMP1a and COMP1b furthermore are connected to two inputs of a NAND junction circuit, the output of COMP1a being directly connected thereto and the output of COMP1b via an inverter INV. The output of NAND is connected to a signal input SE of timer T.

The mode of operation of the embodiment of a circuit according to the invention, as shown in FIG. 1, will now be elucidated by way of a consideration of the eight cases of operation that were already explained in connection with FIG. 6, and with the aid of the signal paths shown in FIGS. 2 to 5.

For the sake of simplicity, the individual signal paths of these figures, too, are designated only by the line or the circuit point where they occur.

Case 1

Figure 2:
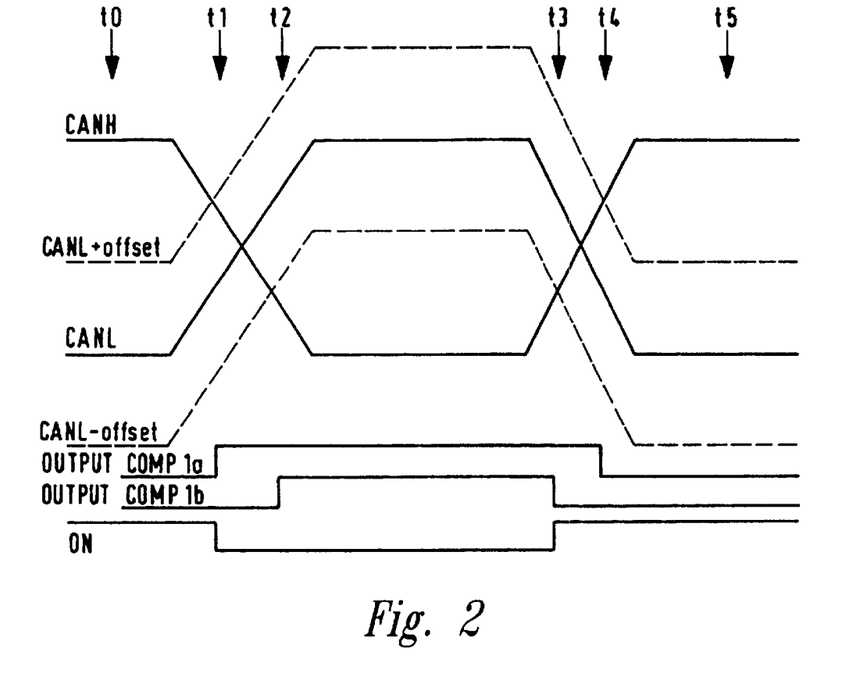
FIGS. 2 to 5 show signal paths for various modes of operation of the receiving circuit according to the invention.

In this case both lines CANH and CANL operate in undisturbed manner in the normal mode of operation of the receiving circuit. The associated signal paths are shown in FIG. 2. It can be seen therefrom that the signal paths received via CANH and CANL are synchronous with respect to their pulse times and pulse lengths, but opposite or inverted with respect to their logic values. The superimposition both of a positive offset voltage (briefly referred to as +offset in FIGS. 2 to 5) and of a negative offset voltage (briefly referred to as −offset in said figures) on the signal path on CANL has the result that two threshold values arise for the signal path on CANH, namely a higher first threshold value referred to as CANL+offset in the figures, as well a lower threshold value referred to as CANL−offset in the figures. These threshold values are shown in broken lines in the figures and are variable in accordance with the path of the pulse signal on CANL.

FIG. 2 indicates six points of time t0 to t5. At the time t0, the pulse signals of CANH and CANL are at high and low logic potential values, respectively, and the potential on CANH is higher than CANL+offset and CANL−offset. A low logic value potential thus arises at each of the outputs of COMP1a and COMP1b. Flip-flop FF is not set, so that a high logic potential value is present at the output QN thereof At the time t1, the signal path of CANH intersects the signal path CANL+offset in the direction of decrease or downward direction. The output of COMP1a thus changes to a high logic potential value (in the following briefly referred to as H). The output of COMP1b remains on a low potential value (in the following briefly referred to as L). The ascending edge at the output of COMP1a sets flip-flop via the first setting input S1, so that the output QN thereof drops from H to L. Via the switching means SW, the output signal of output QN reaches the output RxD, so that the same signal path as that present at the output QN of flip-flop FF is present at output RxD.

At the time t2, the pulse signal of CANH intersects, in downward direction, the lower second threshold value defined by the path of CANL−offset. This is why the output of COMP1b now also changes from L to H. As the flip-flop has already been set via the first setting input S1 at the time t1, no change of the switching state of FF is caused thereby.

At the time t3, the signal path of CANH again crosses, in upward direction, the lower threshold value established by CANL−offset, and the output of COMP1b therefore drops from H to L. The descending pulse edge formed thereby effects resetting of flip-flop FF via second resetting input R2 and thus causes a change from L to H at the output QN thereof and the receiving circuit output RxD.

At the time t4, the signal path of CANH in upward direction crosses also the upper threshold value defined by CANL+offset, effecting a change of the output of COMP1*a* from H to L. This has no influence on the switching state of FF since the latter has already been reset at the time t3.

At the time t5, the receiving circuit has reached again the same state it had at the time t0.

In the normal mode of operation, the receiving circuit according to FIG. 1 leads to the same operating result as the conventional circuit according to FIG. 6, with the exception that the pulse width of the pulses arising at receiving circuit output RxD is more accurate than in case of the receiving circuit according to FIG. 6.

Case 2

Figure 3:
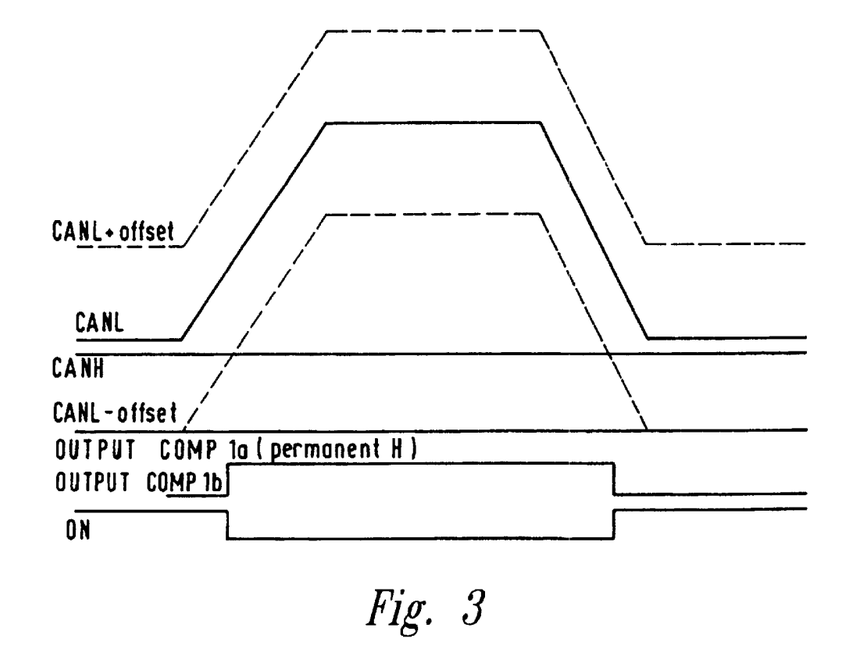

In case of an interruption of line CANH, the signal path on CANH is constantly pulled down to L, as was already elucidated in connection with FIG. 6. This leads to a signal path as shown in FIG. 3. CANH remains constant on a low potential L. However, the signal path still intersects, in upward and downward directions, the lower threshold value defined by CANL−offset, thereby causing a potential change at the output of COMP1*b* and thus alternate setting and resetting of flip-flop FF via second setting input S2 and second resetting input R2, respectively. Although the output signal of COMP1*a* no longer changes, the output signal of COMP1*b* is sufficient for generating a correct pulse signal at QN and RxD.

Case 3

Figure 4:
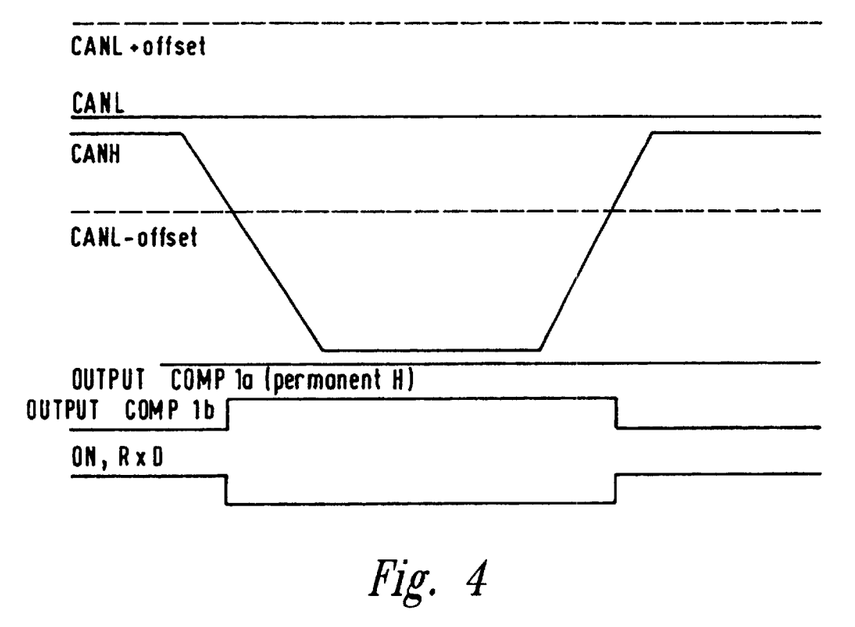

As was already elucidated in connection with FIG. 6, an interruption of CANL leads to a constant voltage value of 5V at the input of the receiving circuit connected to CANL. The associated signal paths are indicated in FIG. 4. Accordingly, the pulse signal on CANH still falls below and exceeds the lower threshold value defined by CANL−offset, and thus changes between L and H still take place at the output of COMP1*b*, whereby a correct pulse signal is again present at QN and RxD.

Case 4

A short circuit of CANH to battery is treated in the same manner as in the conventional receiving circuit. This means, this short circuit with the battery voltage of e.g., 12 Volt is determined by comparator COMP2, which results in switching over of switching means SW to the output of comparator COMP5 as well as single-line operation with evaluation of the signal path on CANL only. In this case, too, safe operation is ensured.

Case 5

Figure 5:
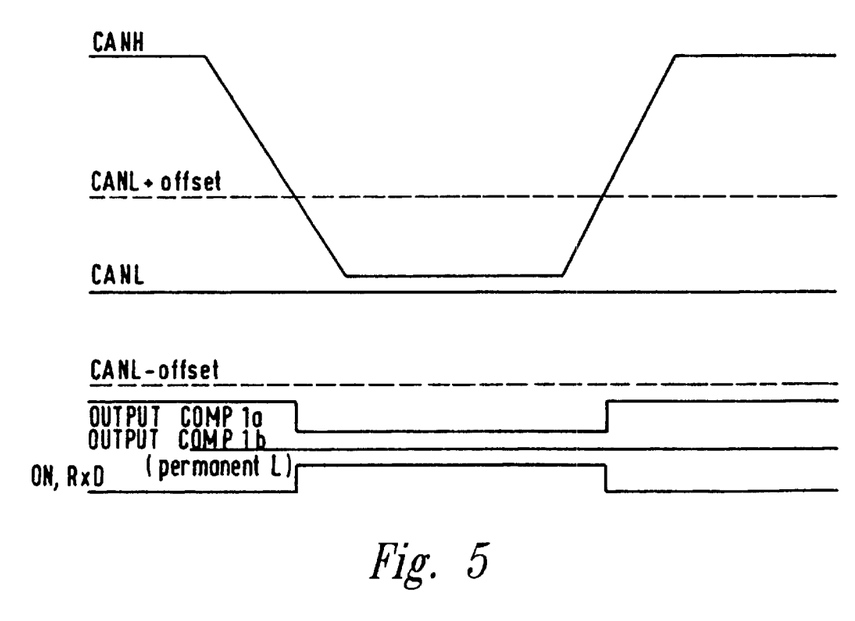

A short circuit of CANL to ground leads to a signal behavior complementary to the signal behavior shown in FIG. 4, as illustrated in FIG. 5. CANH in this case falls below and exceeds the upper threshold value defined by CANL+offset, resulting in a corresponding logic value change between L and H at the output of COMP1*a*. This is sufficient for switching flip-flop FF in corresponding manner and for producing a correct pulse path at QN and RxD.

In this case, which cannot be handled by the conventional circuit, but with the aid of the timer is reported as erroneous operation after a specific delay in time, a circuit according to the invention can continue its correct operation. There is no data loss, and there is thus no need, either, to store data on the transmitter side.

Case 6

A short circuit of CANH to ground leads to the same signal path as in case 2, i.e., the signal path according to FIG. 3. The receiving circuit continues its correct operation in this case as well.

Case 7

A short circuit of CANL to battery is ascertained by means of comparator COMP3, as in case of the conventional receiving circuit. In this case, receiving circuit output RxD is connected to the output of COMP4 via MUX and SW, thereby switching over to single-line operation with evaluation of the pulse signal received via CANH. A correct pulse signal thus appears at RxD.

Case 8

When CANH and CANL are short circuited to each other, this results in permanent H at the output of COMP1*a*, whereas COMP1*b* remains permanently L. At the output of NAND and thus at control input SE of timer T, this results in permanent L, which is detected by timer T. The same measures may be taken now as in case of the conventional receiving circuit.

The circuit according to the invention permits correct data transfer without the repeated transmission of data blocks in case 5 in which CANL is short circuited to ground. The occurrence of an error in cases 2, 3, 5, 6, and 8 can be determined more rapidly than in the case of the conventional receiving circuit. The conventional receiving circuit remains operable, but does not recognize cases 2 and 6 as errors. This is why no error signal can be issued, either, which requests checking of the CAN system.

In case 8, the occurrence of an error is detected more rapidly by the receiving circuit according to the invention. However, the reaction time of the system in total remains the same as in the known receiving circuit since this time is dependent upon the timer parameters which, in turn, are influenced by the CAN protocol.

Figure 10:
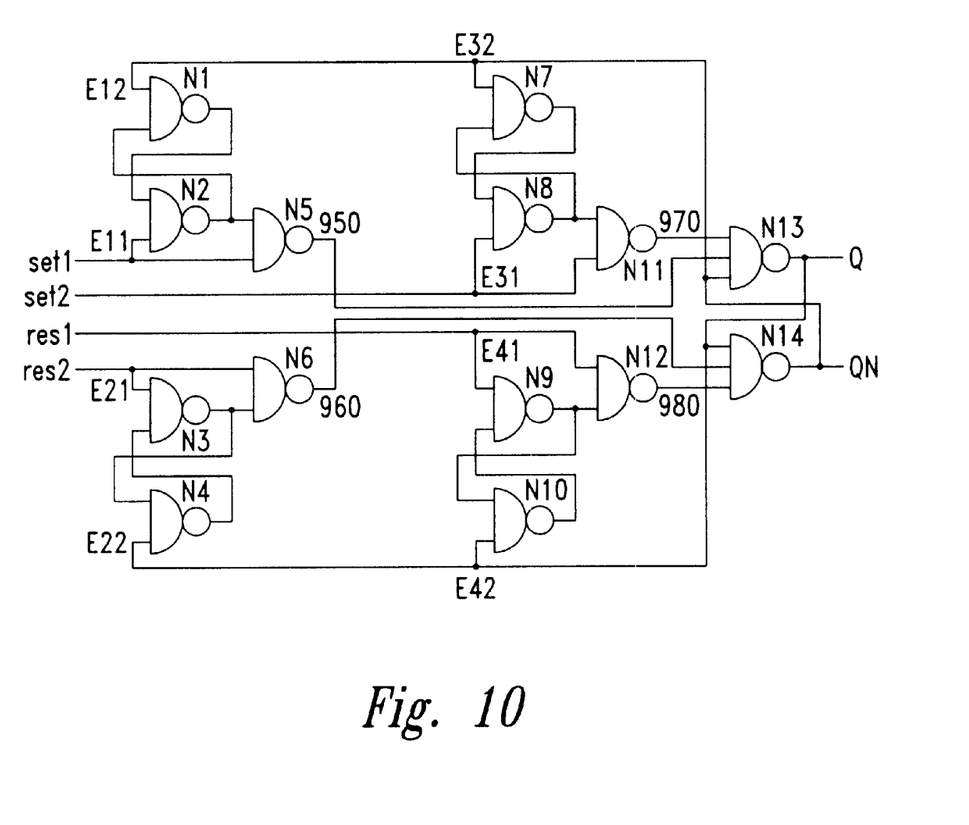
FIG. 10 shows an example of a dynamic flip-flop circuit used in the receiving circuit of FIG. 1.

FIG. 10 shows an example of a dynamic flip-flop circuit that can be used in the receiving circuit of the present invention. In this figure, one can see on the right-hand side the basic elements of a conventional RS flip-flop having two NAND gates N13 and N14, where an output of NAND gate 13 corresponds to the signal output Q and an output of NAND gate 14 corresponds to the inverting output QN of the conventional RS flip-flop. In contrast to the conventional RS flip-flop, however, there are two set inputs set1 and set2 and two reset inputs res1 and res2 that are coupled with the NAND gates N13 and N14 via four pulse forming circuits. A first one of these pulse forming circuits includes a RS flip-flop having NAND gates N1, N2 and a NAND gate N5 following thereto. A second one of these pulse forming circuits includes a RS flip-flop having NAND gates N3, N4 and a NAND gate N6 following thereto. A third one of these pulse forming circuits includes a RS flip-flop having NAND gates N7, N8 and a NAND gate N11 thereto. A fourth one of these pulse forming circuits includes a RS flip-flop having NAND gates N9, N10 and a NAND gate N12 following thereto.

Of the two set inputs set1 and set2, a first set input set1 is connected to a first input E11 of the first pulse forming circuit and a second set input set2 is connected to a first input E31 of the third pulse forming circuit. Of the two reset inputs res1 and res2, a first reset input res1 is connected to a first input E41 of the fourth pulse forming circuit and a second reset input res2 is connected to a first input E21 of the second pulse forming circuit. Each of the two NAND gates N13 and N14 has three inputs. Of the three inputs of NAND gate N13, a first one is connected to an output q50 of the first pulse forming circuit, a second one is connected to an output q70 of the third pulse forming circuit, and a third one is connected to a second input E12 of the first pulse forming circuit and to a second input E32 of the third pulse forming circuit. Of the three inputs of NAND gate N14, a first one is connected to an output q60 of the second pulse forming circuit, a second one is connected to an output q80 of the fourth pulse forming circuit, and a third one is connected to a second input E22 of the second pulse forming circuit and to a second input E42 of the fourth pulse forming circuit.

With a dynamic flip-flop circuit like that depicted in FIG. 10, undefined signal conditions cannot occur as in conventional non-clocked flip-flops.

Those skilled in the art will appreciate that the present invention may be accomplished with circuits other than those particularly depicted and described in connection with FIG. 1. This figure represents just one of many possible implementations of a CAN receiving circuit in accordance with the present invention. Those skilled in the art will also understand that each of the circuits whose functions and interconnections are described above is of a type known in the art. Therefore, one skilled in the art will be readily able to adapt such circuits in the described combination to practice the invention. Particular details of these circuits are not critical to the invention, and a detailed description of the internal circuit operation need not be provided.

It will be appreciated that, although specific embodiments of the invention have been described for purposes of illustration, various modifications may be made without deviating from the spirit and scope of the invention. Those skilled in the art will appreciate that many of the advantages associated with the circuits and processes described above may be provided by other circuit configurations and processes. Indeed, a number of suitable circuit components can be adapted and combined in a variety of circuit topologies to implement a CAN receiving circuit in accordance with the present invention. Accordingly, the invention is not limited by the particular disclosure above, but instead the scope of the invention is determined by the following claims.

What is claimed is:

1. A receiving circuit for a digital data transfer system with differential data transfer via a bus having a first line and a second line, a first bit value of the transferred data having associated therewith a high potential on the first line and a low potential on the second line, and a second bit value of the transferred data having associated therewith a low potential on the first line and a high potential on the second line, the receiving circuit comprising:

a first signal input connected to the first line, a second signal input connected to the second line, and a signal output;

a first comparator circuit assembly for differential evaluation of first and second pulse signals received via the first and second lines, respectively, with the second pulse signal having an offset voltage superimposed thereon prior to said differential evaluation;

the first comparator circuit assembly superimposing on the second pulse signal both a positive offset voltage and a negative offset voltage and having two comparator outputs, a first one of these comparator outputs delivering a first logic potential value when the first pulse signal exceeds a higher, first threshold value corresponding to the potential value of the second pulse signal increased by the positive offset voltage, and otherwise delivers a second logic potential value, and a second one of the comparator outputs delivering the first logic potential value when the first pulse signal exceeds a lower, second threshold value corresponding to the potential value of the second pulse signal reduced by the negative offset voltage, and otherwise delivers the second logic potential value; and a bistable multivibrator circuit connected between the outputs of the first comparator circuit assembly and the signal output, the bistable multivibrator circuit being switchable to a setting state by a change of the first or second comparator output to the first logic potential value, and to a resetting state by a change of the first or second comparator output to the second logic potential value.

2. The receiving circuit of claim 1 wherein the first comparator circuit assembly comprises a first comparator and a second comparator each having a first comparator input, a second comparator input, and a comparator output, the comparator outputs of the first and second comparators providing the first and second comparator outputs of the first comparator circuit assembly, respectively, the second comparator inputs being each coupled to the first line, and the first comparator inputs of the first and second comparators being coupled to the second line via an interconnected first offset voltage source delivering the positive offset voltage and via an interconnected second offset voltage source delivering the negative offset voltage, respectively.

3. The receiving circuit of claim 2 wherein the bistable multivibrator circuit includes a dynamic RS flip-flop having two setting inputs responsive to ascending edges and two resetting inputs responsive to decreasing edges, one of the two setting inputs and one of the two resetting inputs being connected to the output of the first comparator, and another of the two setting inputs and another of the two resetting inputs being connected to the output of the second comparator.

4. The receiving circuit of claim 2, further comprising a second comparator circuit assembly by means of which:

the electrical potential of the first line is monitored with respect to exceeding a high first potential threshold value corresponding to a first logic value and, when this value is exceeded, a first potential value exceeding signal is generated;

the electrical potential of the second line is monitored with respect to exceeding the first potential threshold value and, when this value is exceeded, a second potential value exceeding signal is generated;

the electrical potential of the first line is monitored with respect to exceeding a second potential threshold value located between the potential value of the first logic value and a potential value of a lower, second logic value;

the electrical potential of the second line is monitored with respect to falling below the second potential threshold value; and the receiving circuit further comprising a switching means which couples the signal output to an output side of the first comparator circuit assembly when neither the first nor the second potential value exceeding signal is generated, and which couples the signal output to an output side of the second comparator circuit assembly when either the first or the second potential value exceeding signal is generated.

5. The receiving circuit of claim 4 wherein the second comparator circuit assembly comprises:

a third comparator by means of which the electrical potential of the first line is monitored with respect to exceeding the first potential threshold value;

a fourth comparator by means of which the electrical potential of the second line is monitored with respect to exceeding the first potential threshold value;

a fifth comparator by means of which the electrical potential of the first line is monitored with respect to exceeding the second potential threshold value;

a sixth comparator by means of which the electrical potential of the second line is monitored with respect to falling below the second potential threshold value; and the switching means coupling the signal output to the output of the first comparator circuit assembly when neither the first nor the second potential value exceeding signal is generated, and coupling the signal output to the output of the sixth or the fifth comparator when the first or the second potential value exceeding signal is generated, respectively.

6. The receiving circuit of claim 5 wherein a multiplex control logic circuit is disposed between the outputs of said third and fourth comparators and the switching means.

7. The receiving circuit of claim 6 wherein the multiplex control logic circuit is controlled by a timer having a control input connected to the output of a NAND junction circuit which has a first NAND input connected directly to the output of the first comparator and a second NAND input connected to the output of the second comparator via an inverter.

8. The receiving circuit of claim 6 wherein the switching means comprises a first input connected to an output of the bistable multivibrator circuit, a second input connected to an output of the fifth comparator, and a third input connected to an output of the sixth comparator, and switching between these three inputs can be controlled by means of the multiplex control logic circuit.

9. A receiving circuit for a digital data transfer system in which data is transmitted via first and second lines carrying first and second data signals, respectively, the receiving circuit comprising:

first and second receiver inputs adapted for coupling with the first and second lines, respectively;

a receiver output;

comparison circuitry coupled with the first and second receiver inputs and having first and second comparison outputs, the comparison circuitry operable to receive the data signals and provide first and second comparison signals at the first and second comparison outputs, respectively, the first comparison signal having a first or second logic value when the first and second data signals respectively do or do not satisfy a first comparison relation, and the second comparison signal having the first or second logic value when the first and second signals respectively do or do not satisfy a second comparison relation; and a bistable multivibrator coupled with the first and second comparison outputs and with the receiver output, the bistable multivibrator producing an output signal having first and second states, the bistable multivibrator producing the output signal of the first state in response to the first or second comparison signal transitioning to the first logic value, the bistable multivibrator producing the output signal of the second state in response to the first or second comparison signal transitioning to the second logic value.

10. The receiving circuit of claim 9 wherein the comparison circuitry includes first and second offset voltage sources respectively providing first and second offset values of the second data signal, the first comparison relation being satisfied when the first data signal has a value exceeding the first offset value of the second data signal, and the second comparison relation being satisfied when the first data signal has a value exceeding the second offset value of the second data signal.

11. The receiving circuit of claim 10 wherein the first and second offset voltage sources provide positive and negative voltage offsets.

12. The receiving circuit of claim 9 wherein the comparison circuitry includes:

a first comparator having a first input coupled with the first receiver input and a second input coupled with the second receiver input by a first offset voltage source, the first comparator providing the first comparison signal; and a second comparator having a first input coupled with the first receiver input and a second input coupled with the second receiver input by a second offset voltage source, the second comparator providing the second comparison signal.

13. The receiving circuit of claim 9 wherein the comparison circuitry includes:

a first comparator having a first input coupled with the first receiver input and a second input coupled with the second receiver input by a positive offset voltage source, the first comparator providing the first comparison signal; and a second comparator having a first input coupled with the first receiver input and a second input coupled with the second receiver input by a negative offset voltage source, the second comparator providing the second comparison signal;

and wherein the bistable multivibrator includes a dynamic flip-flop having first and second set inputs coupled with the first and second comparison outputs, respectively, the dynamic flip-flop also having first and second reset inputs coupled with the first and second comparison outputs, respectively.

14. The receiving circuit of claim 9 wherein the bistable multivibrator is coupled with the receiver output by a switching circuit that selectively passes the output signal of the bistable multivibrator to the receiver output.

15. In a digital data transfer system in which data is transmitted via first and second lines carrying first and second data signals, respectively, a method of receiving the first and second data signals and correspondingly producing a data output signal, comprising:

comparing the first data signal to a first offset value of the second data signal and responsively producing a first comparison signal having first and second logic values;

comparing the first data signal to a second offset value of the second data signal and responsively producing a second comparison signal having the first and second logic values, producing the data output signal of a first state when the first or second comparison signal transitions to the first logic value; and producing the data output signal of a second state when the first or second comparison signal transitions to the second logic value, wherein comparing the first data signal to a first offset value of the second data signal includes comparing the first data signal to a positive offset value of the second data signal, and wherein comparing the first data signal to a second offset value of the second data signal includes comparing the first data signs to a negative offset value of the second data signal.

16. In a digital data transfer system in which data is transmitted via first and second lines carrying first and second data signals, respectively, a method of receiving the first and second data signals and correspondingly producing a data output signal, comprising:

comparing the first data signal to a first offset value of the second data signal and responsively producing a first comparison signal having first and second logic values;

comparing the first data signal to a second offset value of the second data signal and responsively producing a second comparison signal having the first and second logic values;

producing the data output signal of a first state when the first or second comparison signal transitions to the first logic value; and producing the data output signal of a second state when the first or second comparison signal transitions to the second logic value, wherein comparing the first data signal to a first offset value of the second data signal includes comparing the first data signal to a positive offset value of the second data signal and responsively producing the first comparison signal of the first state when the first data signal has a value exceeding the positive offset value of the second data signal, and wherein comparing the first data signal to a second offset value of the second data signal includes comparing the first data signal to a negative offset value of the second data signal and responsively producing the second comparison signal of the first state when the first data signal has a value exceeding the negative offset value of the second data signal.

17. The method of claim 15 wherein the first offset value has a first absolute value and the second offset value has a second absolute value, the first absolute value and the second absolute value being unequal.

* * * * *

UNITED STATES PATENT AND TRADEMARK OFFICE
CERTIFICATE OF CORRECTION

PATENT NO. : 6,493,401 B1
DATED : December 10, 2002
INVENTOR(S) : Ricardo Erckert It is certified that error appears in the above-identified patent and that said Letters Patent is hereby corrected as shown below:

Column 12,
Lines 57 and 58, "the first data signs" should read as -- the first data signal --.

Signed and Sealed this

Twenty-seventh Day of May, 2003

JAMES E. ROGAN
*Director of the United States Patent and Trademark Office*